(12) United States Patent
Hipsky et al.

(10) Patent No.: US 8,459,966 B2
(45) Date of Patent: Jun. 11, 2013

(54) RAM AIR FAN MOTOR COOLING

(75) Inventors: Harold W. Hipsky, Willington, CT (US); Darryl A. Colson, West Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 145 days.

(21) Appl. No.: 12/838,797

(22) Filed: Jul. 19, 2010

(65) Prior Publication Data
US 2012/0014784 A1 Jan. 19, 2012

(51) Int. Cl.
*F04B 39/06* (2006.01)

(52) U.S. Cl.
USPC ........... 417/369; 417/325; 417/423.8; 62/401

(58) Field of Classification Search
USPC ................... 417/325, 369, 423.8; 62/86, 401
See application file for complete search history.

(56) References Cited

U.S. PATENT DOCUMENTS

| | | | |
|---|---|---|---|
| 6,681,592 B1 | 1/2004 | Lents et al. | |
| 6,684,660 B1 | 2/2004 | Bruno et al. | |
| 6,928,832 B2 | 8/2005 | Lents et al. | |
| 7,074,010 B2 | 7/2006 | DeGroff et al. | |
| 7,302,804 B2 * | 12/2007 | Murry et al. | 62/86 |
| 7,305,842 B1 | 12/2007 | Schiff | |
| 7,322,202 B2 | 1/2008 | Zywiak et al. | |
| 7,334,422 B2 | 2/2008 | Zywiak et al. | |
| 7,695,355 B2 | 4/2010 | Doherty | |
| 2004/0261428 A1 | 12/2004 | Murry et al. | |
| 2011/0017426 A1 | 1/2011 | Baumgardt et al. | |

FOREIGN PATENT DOCUMENTS

WO WO2009080168 A1 7/2009

* cited by examiner

*Primary Examiner* — Charles Freay
*Assistant Examiner* — Patrick Hamo
(74) *Attorney, Agent, or Firm* — Cantor Colburn LLP

(57) ABSTRACT

A ram air fan assembly includes a ram air fan disposed at a fan inlet and a ram air fan motor operably connected to the ram air fan. A blower is operably connected to the ram air fan and is configured to redirect a cooling flow across the ram air fan motor from a substantially axially directed flow to a substantially radially directed flow thereby increasing the cooling flow across the ram air fan motor. A method of cooling a ram air fan assembly includes urging a cooling flow toward the ram air fan motor and is directed across the ram air fan motor thus removing thermal energy from the ram air fan motor. The cooling flow proceeds across a blower operably connected to the ram air fan motor, thus directing the cooling flow substantially radially outwardly toward the fan inlet.

13 Claims, 2 Drawing Sheets

RAM AIR FAN MOTOR COOLING

BACKGROUND OF THE INVENTION

The subject matter disclosed herein relates to aircraft environmental control. More specifically, the subject disclosure relates to cooling of a ram air fan motor for an aircraft environmental control system.

Many types of aircraft use ram air flow for various purposes, such as in cooling systems for the aircraft. For example, the ram air flow may be utilized to remove heat from various aircraft lubrication and electrical systems and/or used to condition aircraft cabin air. When the aircraft is in flight, the movement of the aircraft creates a sufficient source of ram air flow which can be used for the purposes described above. When the aircraft is on the ground or is operating at low speeds, however, a fan is typically utilized to increase air flow to the cooling systems. Such a fan is driven by an electric motor which, in turn, must be cooled by air flowing across it. Cooling flow is drawn at a heat exchanger inlet and across the electric motor to the ram fan inlet. The flow of cooling air and thus the performance of the electric motor and fan is typically limited by the pressure drop from the heat exchanger inlet to the ram fan inlet. Such a limitation may result in reduced performance of the ram air flow system.

BRIEF DESCRIPTION OF THE INVENTION

According to one aspect of the invention, a ram air fan assembly includes a ram air fan disposed at a fan inlet and a ram air fan motor operably connected to the ram air fan. A blower is operably connected to the ram air fan and is configured to redirect a cooling flow across the ram air fan motor from a substantially axially directed flow to a substantially radially directed flow thereby increasing the cooling flow across the ram air fan motor.

According to another aspect of the invention, a method of cooling a ram air fan assembly includes providing a ram air fan located at a fan inlet and a ram air fan motor operably connected to the ram air fan. A cooling flow is urged toward the ram air fan motor and is directed across the ram air fan motor thus removing thermal energy from the ram air fan motor. The cooling flow proceeds across a blower operably connected to the ram air fan motor, thus directing the cooling flow substantially radially outwardly toward the fan inlet.

The detailed description explains embodiments of the invention, together with advantages and features, by way of example with reference to the drawings.

DETAILED DESCRIPTION OF THE INVENTION

Figure 1:
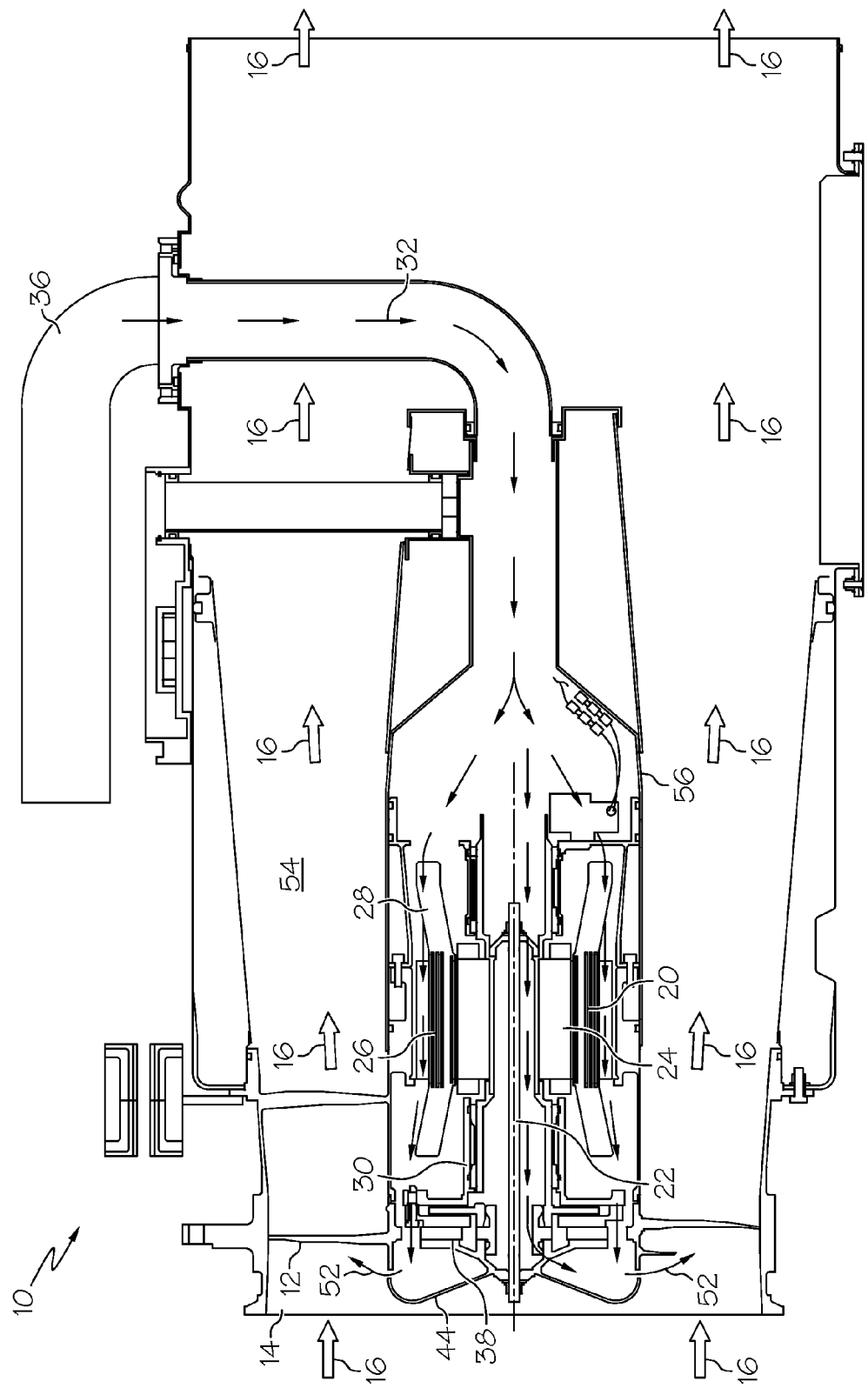
FIG. 1 is a view of an embodiment of a ram air fan assembly.

Shown in FIG. 1 is a view of a ram fan assembly 10 for an aircraft environmental control system (ECS). The ram fan assembly 10 includes a ram air fan (RAF) 12 located at a fan inlet 14. A ram air flow 16 flows into the fan inlet 14 and through a fan passage 54 to a heat exchanger (not depicted) and/or overboard.

The RAF 12 is operably connected to an RAF motor 20 via an RAF shaft 22. The RAF motor 20, located in a motor housing 56, is an electric motor having a rotor 24 rotably located at the RAF shaft 22, and a stator 26 having a plurality of stator windings 28 disposed radially outboard of the rotor 24. The RAF motor 20 also includes one or more bearings 30 disposed at the RAF shaft 22. The RAF 12 and RAF motor 20 are typically utilized to urge additional air flow 16 through the fan inlet 14 when natural airflow 16 into the fan inlet 14 is not sufficient to meet the requirements of the aircraft. To prevent overheating of the RAF motor 20, particularly the stator windings 28 and the bearings 30, a cooling flow 32 is drawn through the motor housing 56 across the RAF motor 20. The cooling flow 32 is drawn through an inlet header 36. The cooling flow 32 proceeds across the RAF motor 20, and the stator windings 28 and bearings 30 removing thermal energy therefrom and to the fan inlet 14 where it enters the fan inlet 14. The cooling flow 32 is driven generally via a pressure differential between the inlet header 36 and the fan inlet 14.

Figure 2:
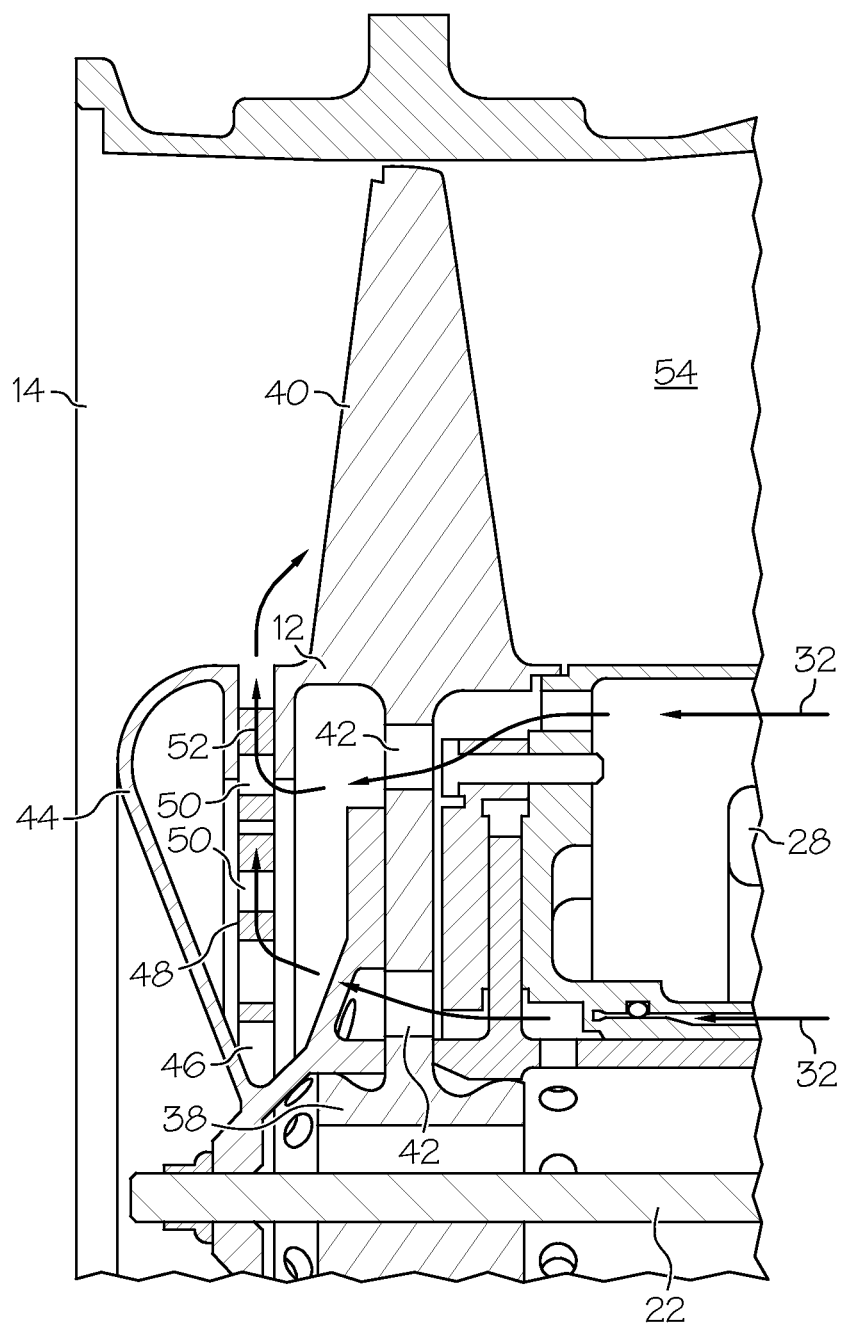
FIG. 2 is a detailed view of an embodiment of the ram air fan assembly of FIG. 1.

The RAF 12 is shown in FIG. 2 in greater detail. The RAF 12 includes an RAF hub 38 located at the RAF shaft 22 and a plurality of RAF blades 40 fixed to the RAF hub 38 which extend across the fan inlet 14. The RAF hub 38 includes a plurality of cooling openings 42 extending therethrough for the egress of the cooling flow 32 from the RAF motor 20 toward the fan inlet 14. A cap 44 is disposed in the fan inlet 14 upstream of the RAF 12 to direct incoming ram air flow 16 toward the fan inlet 14. A blower 46 is disposed axially between the RAF hub 38 and the cap 44 at the RAF shaft 22. The blower 46 includes a blower hub 48 having a plurality of blower blades 50 arranged around a circumference of the blower hub 48. The blower blades 50 are configured to redirect the substantially axial cooling flow 32 from the RAF hub 38 into a substantially radially outwardly directed blower flow 52 toward the fan inlet 14. Once the blower flow 52 is directed toward the fan inlet 14, the RAF blades 40 urge the blower flow 52 through the fan passage 54 toward a heat exchanger and/or overboard. Inclusion of the blower 46 in the RAF 12 increases the pressure differential between the inlet header 36 and the fan inlet 14 and increases a mass flow of the cooling flow 32 across the RAF motor 20. The increased pressure differential and increased mass flow increase the cooling of the RAF motor 20 thus increasing performance of the RAF 12 and the ECS.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A ram air fan assembly comprising:
   a ram air fan disposed at a fan inlet;
   a ram air fan motor operably connected to the ram air fan;
   a blower operably connected to the ram air fan, the blower configured to redirect a cooling flow across the ram air fan motor from a substantially axially directed flow to a substantially radially directed flow thereby increasing the cooling flow across the ram air fan motor, the blower disposed upstream of the ram air fan, relative to a flow direction into the fan inlet; and
   a cap disposed in the fan inlet upstream of the ram air fan;

wherein the blower is disposed axially between the ram air fan and the cap.

2. The ram air fan assembly of claim 1, wherein the blower comprises:
a blower hub affixed to the ram air fan; and
a plurality of blower blades extending from the blower hub, the plurality of blower blades configured to redirect the cooling flow.

3. The ram air fan assembly of claim 1, wherein the ram air fan motor is disposed in a motor housing.

4. The ram air fan assembly of claim 3, wherein the cooling flow is directed through the motor housing.

5. The ram air fan assembly of claim 1, wherein the ram air fan is operably connected to the ram air fan motor via a ram air fan shaft.

6. The ram air fan assembly of claim 1, wherein the ram air fan comprises:
a ram air fan shaft;
a ram air fan hub disposed at the ram air fan shaft; and
a plurality of ram air fan blades extending from the ram air fan hub at least partially across the fan inlet.

7. A ram air fan assembly comprising:
a ram air fan disposed at a fan inlet, the ram air fan including:
a ram air fan shaft;
a ram air fan hub disposed at the ram air fan shaft; and
a plurality of ram air fan blades extending from the ram air fan hub at least partially across the fan inlet;
a ram air fan motor operably connected to the ram air fan;
a blower operably connected to the ram air fan, the blower configured to redirect a cooling flow across the ram air fan motor from a substantially axially directed flow to a substantially radially directed flow thereby increasing the cooling flow across the ram air fan motor, the blower disposed upstream of the ram air fan, relative to a flow direction into the fan inlet; and
a plurality of cooling openings extending through the ram air fan hub to allow cooling flow from the ram air fan motor therethrough.

8. A method of cooling a ram air fan assembly comprising:
providing a ram air fan disposed at a fan inlet and a ram air fan motor operably connected to the ram air fan;
urging a cooling flow toward the ram air fan motor;
directing the cooling flow across the ram air fan motor thus removing thermal energy from the ram air fan motor via the cooling flow;
urging the cooling flow through a plurality of cooling openings in the ram air fan toward a blower operably connected to the ram air fan motor; and
flowing the cooling flow across the blower, thus directing the cooling flow substantially radially outwardly toward the fan inlet, the blower disposed upstream of the ram air fan, relative to a flow direction into the fan inlet.

9. The method of claim 8, wherein flowing the cooling flow across the blower comprises flowing the cooling flow across a plurality of blower blades disposed at a blower hub thereby directing the cooling flow substantially radially outwardly.

10. The method of claim 8, further comprising:
urging the cooling flow across a stator of the ram air fan motor; and
removing thermal energy from the stator via the cooling flow.

11. The method of claim 8, further comprising urging the cooling flow into the fan inlet.

12. The method of claim 11, wherein the cooling flow is urged by the ram air fan.

13. The method of claim 8, further comprising directing the cooling flow toward the ram air fan motor via an inlet header.

\* \* \* \* \*